United States Patent [19]

Beumer et al.

[11] 4,027,805

[45] June 7, 1977

[54] AUTOMATIC LOADING APPARATUS FOR LOADING DISCRETE CARGO, PARTICULARLY SACKS, ONTO STATIONARY OR MOBILE LOADING PLATFORMS

[75] Inventors: Bernhard Beumer, Beckum; Wolfram Jendrzey, Ostenfelde, both of Germany

[73] Assignee: B. Beumer Maschinenfabrik KG, Beckum, Germany

[22] Filed: Oct. 24, 1975

[21] Appl. No.: 625,671

[30] Foreign Application Priority Data

Apr. 17, 1975 Germany .......................... 2516957

[52] U.S. Cl. .............................. 214/6 G; 214/6 P; 214/6 DK
[51] Int. Cl.[2] ......................................... B65G 57/06
[58] Field of Search .................. 214/6 DK, 6 G, 6 P

[56] References Cited

UNITED STATES PATENTS

| 2,703,653 | 3/1955 | Thomson | 214/6 G |
| 2,870,922 | 1/1959 | Thomson | 214/6 P |
| 3,126,105 | 3/1964 | Marguet | 214/6 DK |
| 3,416,674 | 12/1968 | Gualandris et al. | 214/6 DK |
| 3,499,551 | 3/1970 | McWilliams | 214/6 DK |
| 3,520,396 | 7/1970 | Lingg | 214/6 DK X |
| 3,730,357 | 5/1973 | Beaty et al. | 214/6 DK |

*Primary Examiner*—L. J. Paperner
*Attorney, Agent, or Firm*—Toren, McGeady and Stanger

[57] ABSTRACT

An automatic loading apparatus for stacking discrete cargo units such as sacks onto a loading surface of e.g. a truck, a railroad car a.s.o., including several feeding conveyors, sack handling devices such as conveyors, a sack shaping assembly, a movable packing plate or a packing table, pusher and transfer devices, a loading head, sensor controllers, respective drive units associated with the various devices and a program type central control unit. The feeding conveyors may consist of conveyor belts, chutes or roller tracks.

8 Claims, 24 Drawing Figures

(B-B)

(A-A)

AUTOMATIC LOADING APPARATUS FOR LOADING DISCRETE CARGO, PARTICULARLY SACKS, ONTO STATIONARY OR MOBILE LOADING PLATFORMS

The present invention relates to an automatic loading apparatus for loading discrete cargo such as sacks onto stationary or mobile loading platforms. The loading apparatus comprises a machine frame, a feed track for feeding discrete goods mounted in the machine frame, a packing plate and pusher means movable in opposite directions within a plane above the packing plate, the packing plate and the pusher means being movable upwardly and downwardly in a substantially vertical direction through a distance corresponding substantially to the height of a layer of sacks. For loading stationary and mobile loading surfaces such as loading platforms of trucks, railroad carriages, containers, ships, pallets or the like with sacks, there are already known sack loading plants including a movable carrier conveyor system that may be advanced into the loading area so that the discharge point may be brought into any desired position of the loading area. The head portion of a carrier conveyor system of this type includes a two-member loading assembly adapted to be moved through the three dimensions in space so that the assembly may be telescopically extended or retracted or moved through predetermined angular ranges in horizontal and vertical directions. A drawback of heretofore known loading apparatus of this type is that several operators are required for stacking the sacks which stacking has still to be performed manually.

One type of a heretofore known loading apparatus includes a packing plate to which the discrete goods are supplied, along a roller track. The free discharge end of the roller track may be vertically in order to adapt the elevation of the same to the elevational height of the packing plate. With this known apparatus, cardboard boxes are being pushed off the packing plate by means of a pusher member extending parallel to the packing plate longitudinal direction. This type of pusher bar or pusher plate, however, does not allow to push off sacks since the contents or the sacks will be compressed by the advancing pusher member, with the result that no perfectly shaped sack stacks of a high inherent rigidity may be obtained. Additionally, in this prior art apparatus another transverse pusher member is arranged above the packing plate.

In another heretofore known loading apparatus the discrete goods are fed along a carrier conveyor toward a horizontal roller track, and a packing plate is arranged at the downstream end of the roller track. The packing plate extends transversely of the piece goods feed direction and may be elevationally adjusted together with the roller track. The discharge end of the carrier conveyor may be adjusted according to the height of roller track and packing plate. The transfer of a packing row is effected by means of a transfer bar, and concurrently the packing plate is withdrawn from below the sack layer, in order to transfer the sack layer being held between a front abutment surface and a rear abutment.

It is the main object of the present invention to provide a novel and improved automatic loading apparatus of the type as stated at the outset of the present specification.

It is another object of the present invention to provide an automatic loading apparatus that allows an efficient automatic stacking of discrete goods onto loading surfaces, at a relatively high rate, and without requiring the heretofore necessary operators.

It is another object of the present invention to provide an automatic loading apparatus of the above stated type that is suitable for stacking sacks of various sizes and wherein the sack feeding speed immediately before the sacks abut the packing plate may be may be variably adjusted, and every row of sacks may be stacked in the form of a compound stack, in allowing to vary the number of layers of sacks within each layer, in order to achieve a relatively high stability of the sack stack.

It is a further object of the present invention to provide a loading head suitable as an auxiliary equipment or accessory for already existing feeder systems and of relatively small dimensions.

In accordance with the present invention, these objects are achieved by an automatic loading apparatus for loading discrete cargo, particularly sacks, onto stationary or mobile loading platforms, the apparatus comprising a machine frame, a feed track for feeding discrete goods mounted in the machine frame, a packing plate and pusher means movable in opposite directions within a plane above the packing plate, the packing plate and the pusher means being movable upwardly and downwardly in a substantially vertical direction through a distance corresponding substantially to the height of a layer of sacks, the apparatus being characterized by the combination of the following characteristics:

a. a loading head consisting of a mounting frame including a vertical support rod member and a horizontally cantilevered substantially rectangular frame secured to the support rod member, a vertical stop plate extending across the whole width of the packing plate mounted at one face of the rectangular frame and having a pair of longitudinal frame members defining guide rails for guiding a pair of slides movable respectively along either side of the rectangular frame, the slides being driven in a substantially horizontal direction by an associated drive unit, and mounting at their free lower ends the packing plate, the latter being spaced from the frame by a distance corresponding at least to the height of a sack layer, the packing plate being movable in a horizontal direction and transversely of sack rows being assembled and adapted to cooperate with a stationary stop bar extending transversely of the pull-off direction of the packing plate in a position opposite the vertical stop plate;

b. means for slidably displacing the loading head in a plane parallel to the stacking plate;

c. sack feed means on the upstream side of the loading head, the sack feeding means being disposed at an elevating frame in the machine frame in the vicinity of the discharge end of feed conveyor means, and cyclically operated timing feed conveyor means extending parallel to the feed direction of discrete goods and adapted to be moved in increments corresponding substantially to the length or width dimensions of the discrete goods;

d. means for moving the packing plate in the sack feeding direction, a first sensing plate mounted on the bottom of the packing plate, and spring plates serving as actuating means for associated electrical switches;

e. transfer means provided above the packing plate adjacent an end of transverse pusher means that faces the sack feeding means;

f. sack pivoting means operatively associated with the sack feeding means;

g. the loading head including a second sensing plate connected to control members, and these control members being coupled, together with respective control members associated with the first sensing plate, to controller means for controlling feed and elevational movements of the elevating frame.

The invention furthermore relates to a specific embodiment of the automatic loading apparatus wherein an additional conveyor means is coupled, at its discharge end, to a sack pivoting assembly via an upwardly and downwardly movable storage track, a supply conveyor, a pull-off conveyor and an alignment conveyor, a bar chute disposed at the upstream end of the alignment conveyor and intermediate the alignment conveyor and the metering conveyor, the bars of the bar chute extending in the transfer direction, a packing table arranged at the end of the metering conveyor remote from the bar chute, the packing table having as a packing table surface a roller track including a plurality of rollers adapted to be driven by a drive unit, a stop wall at the downstream end of the packing table, motor-driven transfer members being mounted above the packing table and adapted to be moved in a direction parallel to the longitudinal axes of the rollers.

A loading apparatus of this type which includes a horizontally movable packing plate by which an assembled sack layer may be stacked onto an already formed sack layer, without thereby shifting the sack contents allows to load sacks in the form of perfect sack stacks of an inherent rigidity. Since the sacks are being pushed onto the packing plate, the sacks engage the stop plate provided at one face of the packing plate so that the sack contents are compressed in the direction of the stop plate. Whilst the individual sacks are being laterally shifted by means of the transverse pusher, the sack contents are not being compressed in the region abutting the transverse pusher but will be spread evenly throughout the shifting movement so that sack layers may be obtained. By employing a sack pivoting assembly mounted at the upstream side of the loading head there may be achieved a highly fail-safe, fully automatic and very high rate stacking of discrete goods such as particularly sacks.

In the following, the invention will be described more in detail with reference to several preferred embodiments illustrated in the appended drawings wherein FIG. 1 is a schematical lateral elevational view of an automatic loading apparatus in accordance with the present invention, the apparatus including sack feeding means in the form of a chute;

Figure 1:
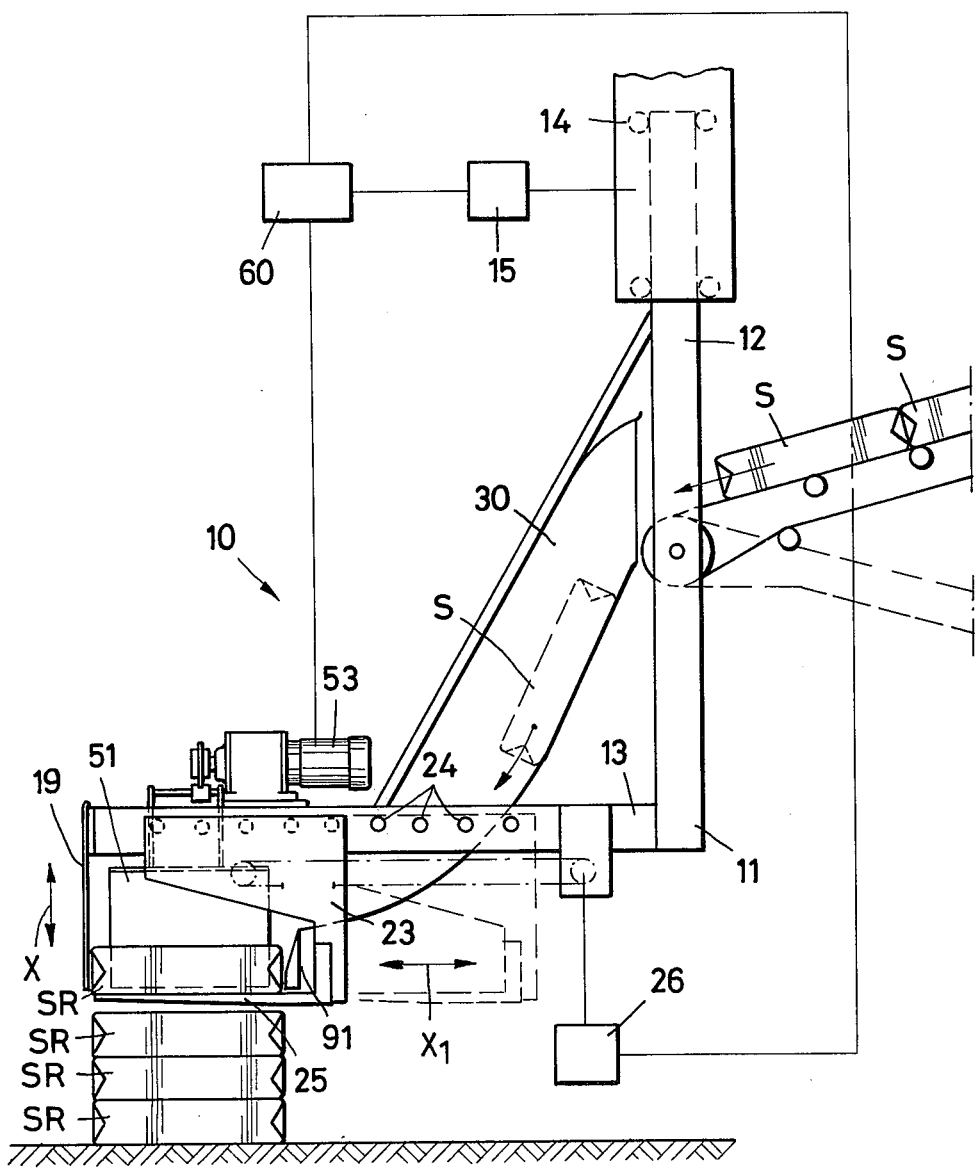

Referring to FIGS. 1 – 4, the loading apparatus 10 is mounted at the discharge end of a feed belt conveyor and comprises a vertical support column 12 and a horizontal support member 13 integral therewith and including an angle of substantially 90° with the support column 12. The free upper end of the support column 12 is mounted in a guide assembly indicated at 14 of the frame structure so that the support frame assembly 11 is vertically movable in the guide assembly in the direction of the double headed arrow $x$. A drive mechanism or unit 15 is provided for moving the support frame assembly 11 up and down in the guide assembly 14. The support frame assembly 11 is mounted on the frame structure.

Figure 2:
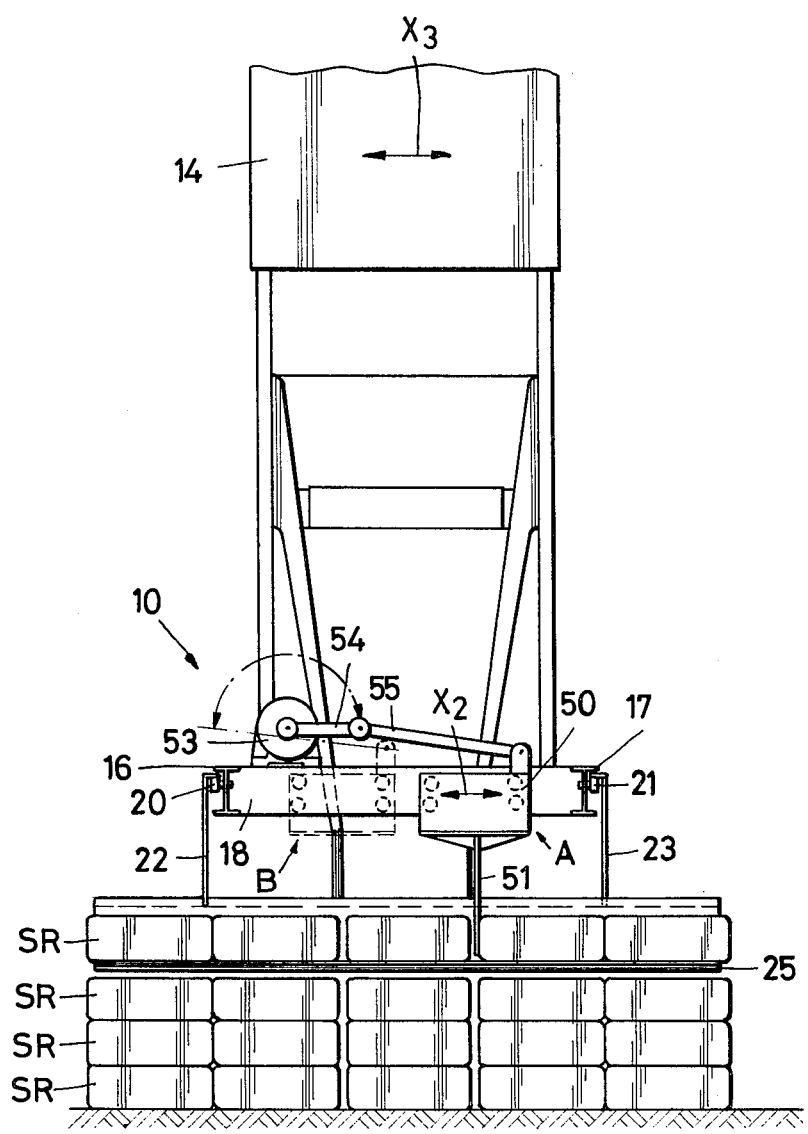
FIG. 2 is a schematical front elevational view of the loading apparatus shown in FIG. 1.
Figure 3:
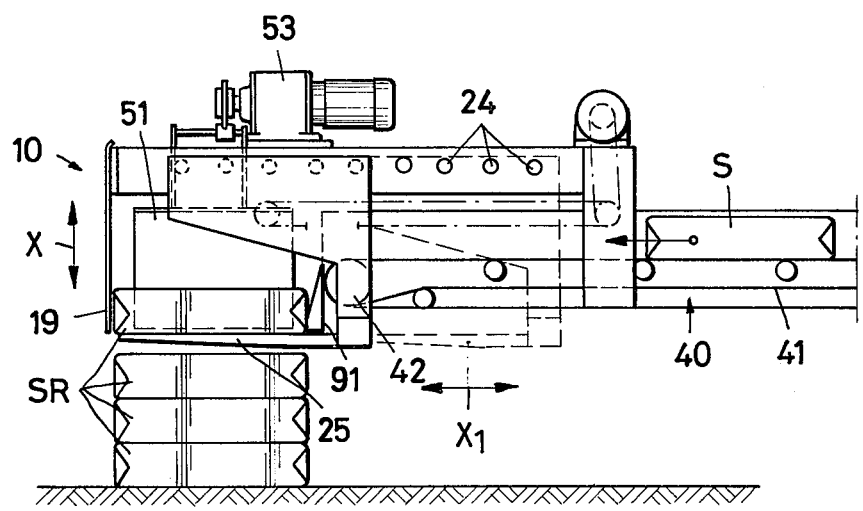
FIG. 3 is a lateral elevational view of another embodiment of the loading apparatus wherein the sack feeding means consists of a belt conveyor.
Figure 4:
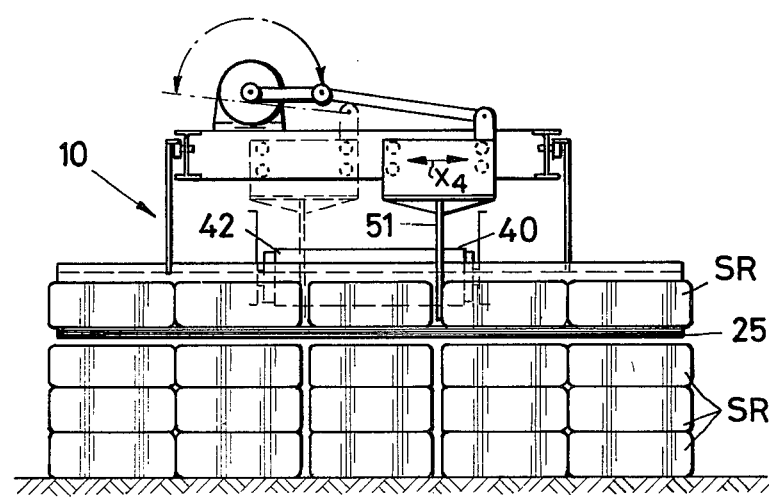
FIG. 4 is a schematical front elevational view of the loading apparatus of FIG. 3.

The horizontal support member 13 of the support frame 11 forms a substantially rectangular cantilevered frame with side members 16, 17 and 18, as may best be seen in FIG. 2. The front side members 18 of the support member 18 mounts a vertical stop or abutment plate 19. The longitudinal side frame members 16, 17 define guide rails 20, 21 or alternately are provided with exterior guide rails for guiding platelike carriages 22 and 23 respectively.

The carriages 22, 23 support a packing plate 25 and are adapted to be moved in a substantially horizontal direction, as indicated by the double headed arrow $x_1$ in FIG. 1, by means of a common drive unit 26. The packing plate 25 may likewise be supported directly in the frame members 16, 17, 18 of the support frame assembly 11 and be guided thereby in the above described manner. Thus, the frame side members 16, 17 may be provided with guide rollers such as guide rollers 24 shown in FIGS. 1 and 2. Correspondingly, the carriages 22, 23 mounting the packing plate 25 and movable along the sides of the frame are provided in their upper end regions with guide rails for the guide rollers 24.

Figure 9:
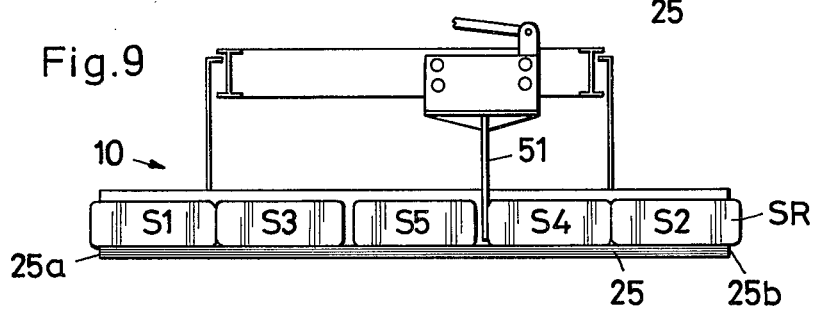

The width of the packing plate 25 corresponds preferably to the length of a discrete cargo unit, i.e. in the present instance to the length of a sack S. The length of the packing plate 25, however, corresponds to a multiple of the width of a sack. In the embodiment shown in FIGS. 7 and 9 the packing plate 25 has suitable dimensions to receive five sacks S aligned in a row side by side. The length of the stop or abutment plate 19 corresponds substantially to the length of the packing plate 25, and the stop plate extends parallel to the packing plate 25.

A feed track for discrete cargo units such as sacks S is mounted in the support frame 11 above the packing plate 25. In the embodiment shown in FIGS. 1 and 2 the feed track consists of a chute 30 whereas in the embodiment shown in FIGS. 3 and 4 the feed track consists of a belt conveyor 40 comprising a driven continuous conveyor belt 41 passing over guide rollers of which only one guide roller 42 on the discharge side of the conveyor belt is shown. The feed track 30 or respectively 40 may also consist of a roller track (not shown) having driven rollers if the roller track extends substantially horizontally, or having idling rollers if the roller track is inclined with respect to a horizontal plane. The mutual arrangement of feed track 30 or respectively 40 and packing plate 25 is selected so that sacks S supplied by the feed track 30 or the feed track 40 respectively will be put down on the packing plate 25 in front of the stop plate 19. The feed track 30 or the feed track 40 respectively is approximately centered with respect to the packing plate 25 and may be adjusted up and down, together with the support frame in the direction of the double headed arrow $x$, as shown in FIG. 1.

A carriage 50 is movably supported on the front member 18 of the support frame 11. The carriage 50 is movable in a direction parallel to the longitudinal extension of the packing plate 25. The carriage 50 mounts upright platelike transverse pusher 51. The frame member 18 of the support frame 11 defines a guide rail along which the carriage 50 with the transverse pusher 51 may be moved in the direction of the double headed arrow $x_2$. A drive unit 53 consisting of a crank drive 54, 55 serves to move the transverse pusher 51 towards either end of the packing plate 25 by increments corresponding substantially to the width of a sack S. In FIG. 2 the transverse pusher 51 is shown in both end positions, i.e. in the end position A in solid lines, and in the opposite end position B in broken lines. Instead of a crank drive 54, 55 it is considered to be within the scope of the present invention to employ any other type of drive unit for oscillating the transverse pusher 51.

To adapt the loading apparatus to any given position of a loading platform, the entire apparatus may be adjusted in a direction parallel to the longitudinal extension of the packing plate 25 in the direction of the double headed arrow $x_3$ of FIG. 2 by means of a drive mechanism not shown in the drawings. For facilitating the positioning of the apparatus there may be provided radiation barriers or optical light switches that are disposed in suitable positions such as for example adjacent the free ends of the packing plate 25. As may be seen in FIG. 4, the overall loading apparatus may also be movable in the direction of the double headed arrow $x_4$, i.e. transversely of the longitudinal extension of the loading platform.

The drive units 15, 26, 53 for moving respectively the packing plate, for alternately moving the transverse pusher 51 and for adjusting the elevation of the support frame assembly are controlled by a control unit 60 (FIG. 1) which provides a certain timing sequence for the various movements of the individual components whereby the sacks S supplied onto the packing plate 25 are moved sideways over a distance corresponding substantially to the width of a sack, towards alternately the one or the other end of the packing plate 25, in thus forming a row of sacks SR on the packing plate 25. When a row of sacks SR has been formed on the packing plate 25, the latter is withdrawn towards the rear of the support frame 11 whereby the row of sacks SR is transferred onto a loading platform or onto the upper surface of one or several rows of sacks that may already have been arranged on a loading platform. Subsequently, the support frame 11 is lifting together with the packing plate 25 through a distance corresponding substantially to the height of a layer of sacks, and the packing plate 25 simultaneously returns into its initial front position.

Figure 5:
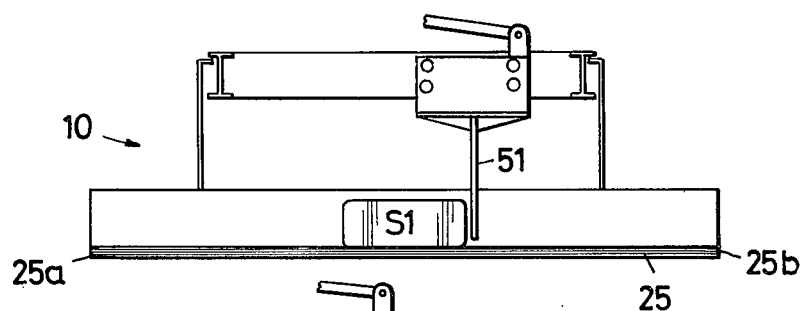
FIGS. 5 – 11 are lateral elevational views for illustrating the loading operation on the packing plate of the loading apparatus, in showing the various phases of sack feeding.
Figure 6:
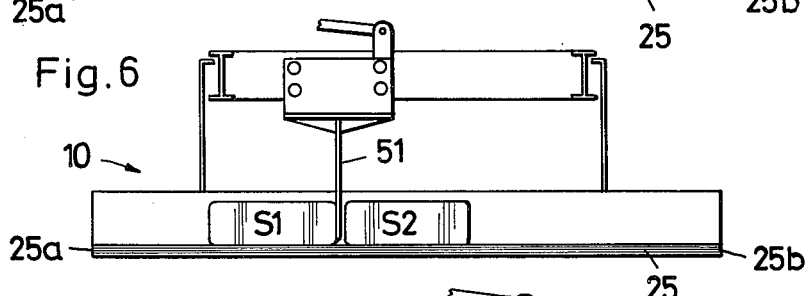
Figure 7:
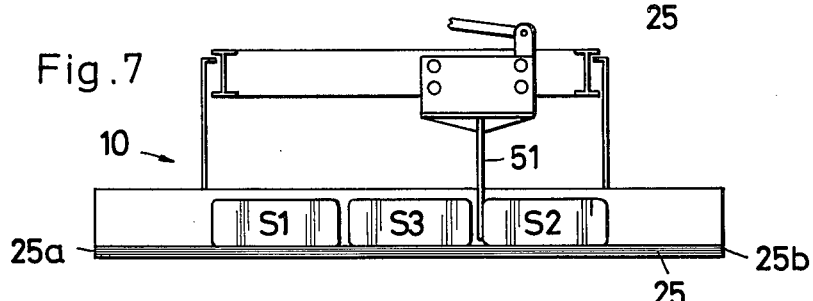
Figure 8:
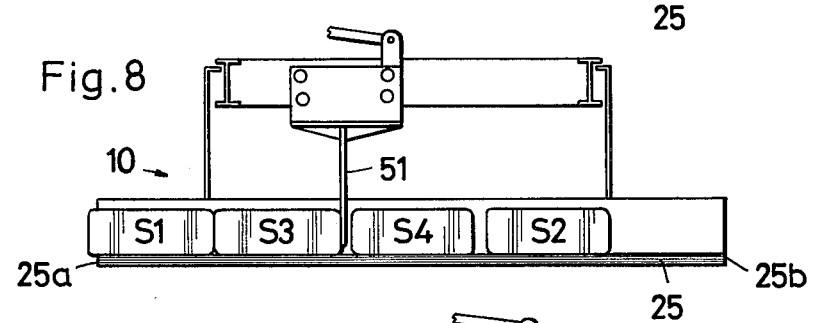

The operation of the automatic loading apparatus of the present invention is briefly as follows:

First of all, the loading apparatus is adjusted manually or assisted by optical light barriers or other suitable control devices into a suitable loading position, i.e. into a predetermined position with respect to a loading platform. The loading operation which may then be initiated is performed fully automatically. A first sack S1 is supplied by the chute 30 to the main components of the loading apparatus proper and is deposited onto the packing plate 25 in front of the stop plate 19. Then this sack S1 is moved by means of the transverse pusher 51 in a direction towards the end of the packing plate 25 indicated by 25a in FIG. 5. The next following sack S2 supplied to the loading apparatus will be moved by a corresponding movement of the transverse pusher 51 in a direction towards the end 25b of the packing plate 25, as shown in FIG. 6. The next sack S3 supplied is then pushed into the gap left between the sacks S1 and S2 whereupon the transverse pusher 51 moves both sacks S3 and S1 towards the packing plate end 25a, as shown in FIG. 7. The fourth sack S4 will come to rest in the gap between the sacks S2 and S3 whereupon the sack S4 together with the sack S2 will be moved by means of the transverse pusher 51 towards the packing plate end 25b, as may be seen in FIG. 8. The transverse pusher 51 then occupies the position shown in FIG. 9. The fifth sack S5 will then be pushed into the gap between the sack S3 and the sack S4 so that at this moment a row of sacks SR consisting of five sacks S1 – S5 has been arranged on the packing plate 25, as may be seen in FIG. 9.

Figure 10:
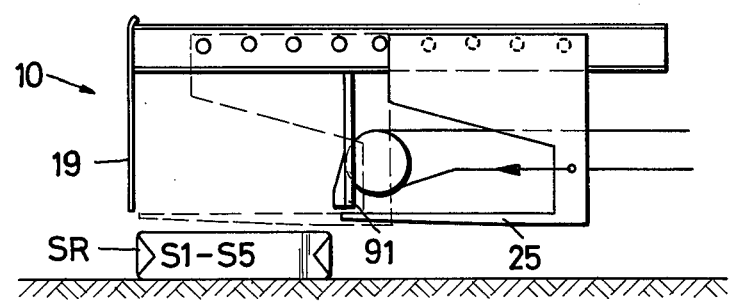
Figure 11:
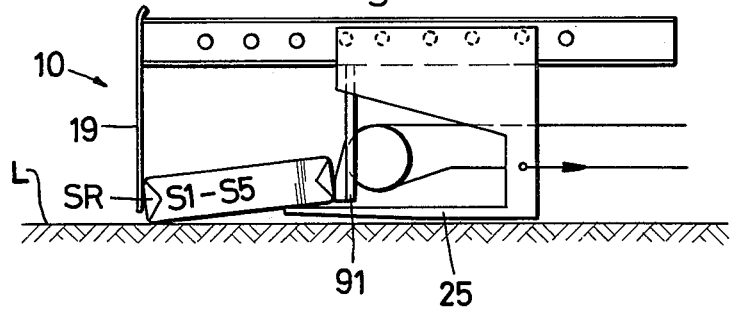

As soon as a row of sacks SR has been lined up on the packing plate 25 in the above described manner, the packing plate 25 is withdrawn towards the rear of the loading apparatus, i.e. towards the vertical support column 12 (FIG. 10), whereby the row of sacks SR consisting of the sacks S1 – S5 will be transferred onto the loading platform indicated by L in FIG. 11. The loading apparatus is then lifted through a distance corresponding substantially to the height of this row of sacks SR, and the packing plate 25 is simultaneously returned into its initial front position. The loading cycle as shown and described with reference to FIGS. 5 – 11 may then be repeated.

Figure 12:
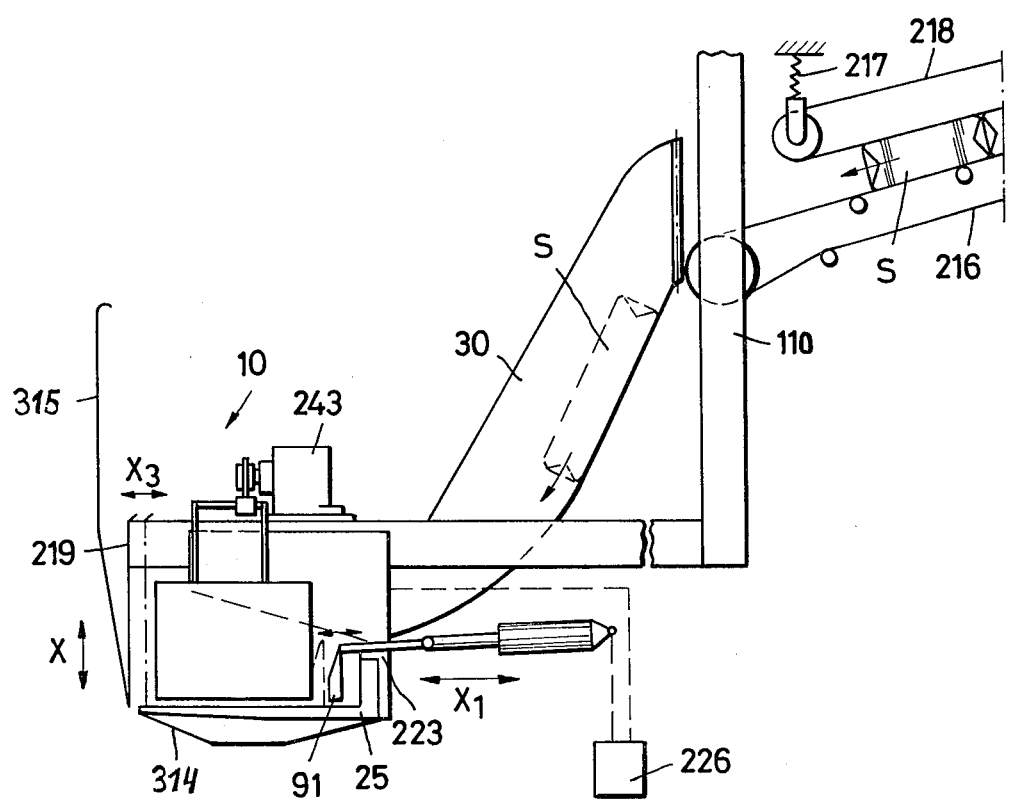
FIG. 12 is a schematical lateral elevational view of the loading head of the loading apparatus with a sack feeding track in the form of a chute.
Figure 13:
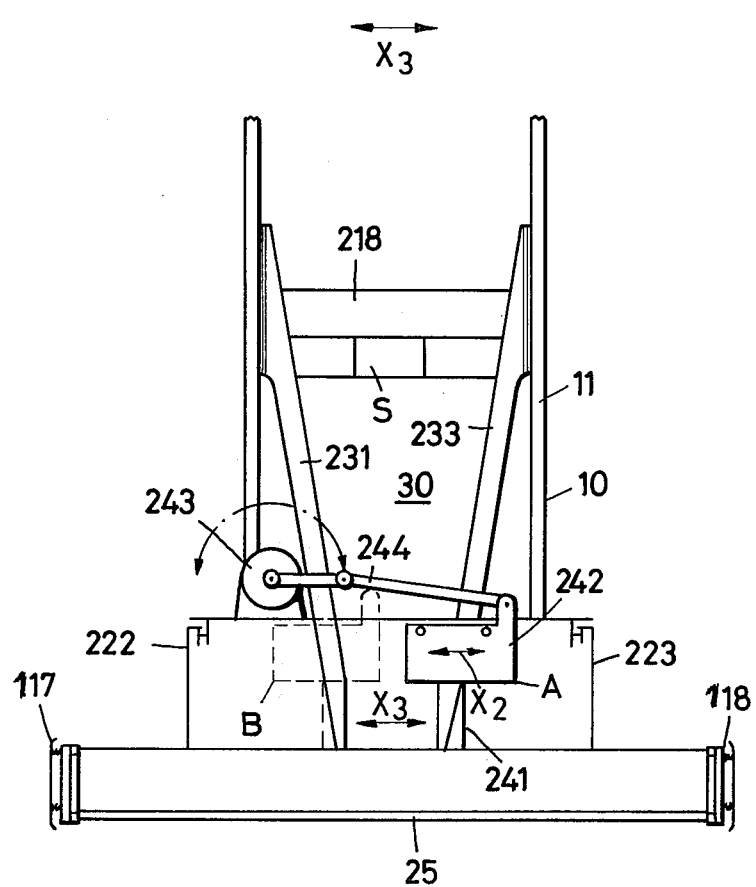
FIG. 13 is a front elevational view of the loading head of FIG. 12.

Referring to FIGS. 12 – 16, the embodiment of the inventive loading apparatus shown therein includes a loading head 10 with an elevating frame 110 mounting the chute 30, the pusher beam 91, a forward packing plate 219 as well as spring plates 117, 118 and 315 (FIGS. 12 and 13). The elevating frame 110 serves to guide platelike slides 222, 223 that support the packing plate 25 and are adapted to be moved in the horizontal direction $x_1$ by a common drive unit 226. At one face of the elevating frame 110 is mounted a movable carriage 242. The carriage 242 extends parallel to the longitudinal direction of the packing plate 25 and may be moved into the direction of the arrow $x_2$. The carriage 242 mounts a vertical platelike transverse pusher 241.

The adjustable pusher beam 91 may likewise be moved parallel to the longitudinal direction. The forward packing plate 219 is adjustable in the horizontal direction as shown by $x_3$. By means of a drive unit 243 with a crank drive 244 the transverse pusher 241 may be moved towards both ends of the packing plate 25 by the width of a sack into the stop positions A and B. The loading head 10 may be moved parallel of the packing plate longitudinal direction, in the direction of the arrow $x_3$ until the loading head abuts the spring plates 117, 118 of electrical limit switches not shown.

Figure 14:
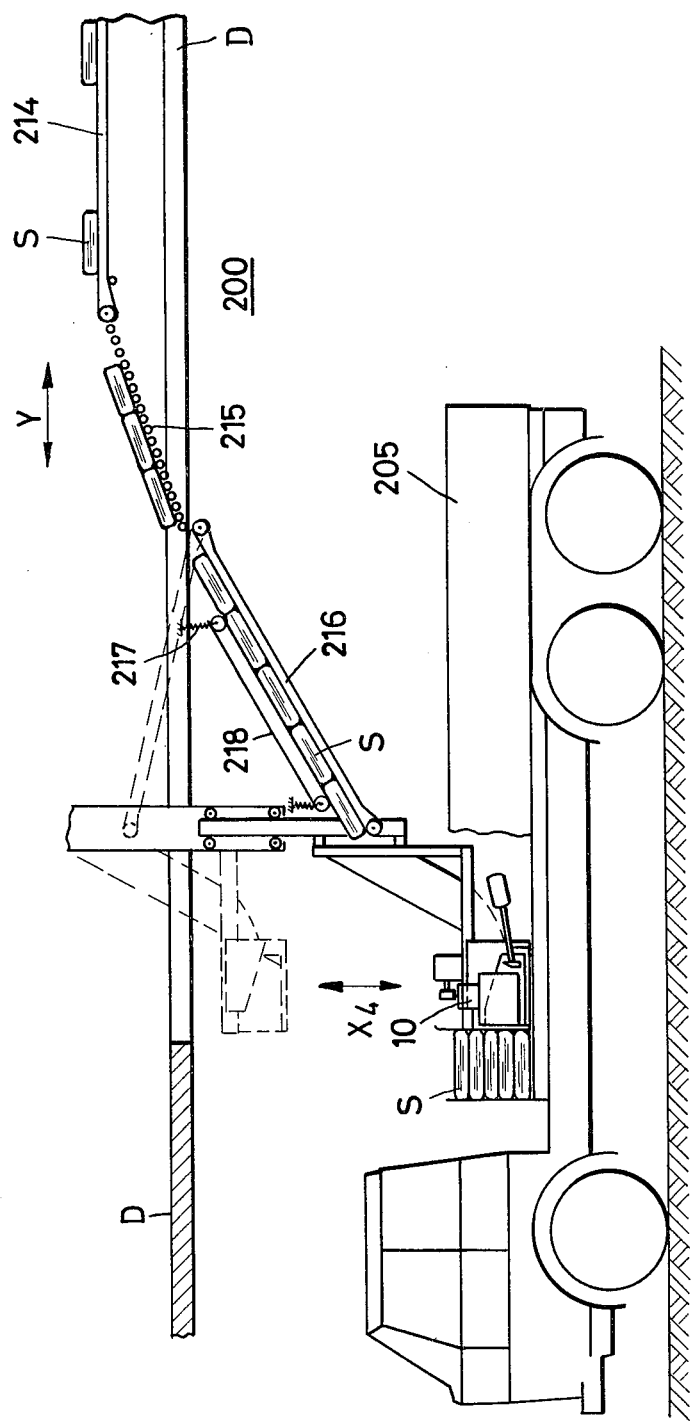
FIG. 14 is a lateral elevational view of the loading head of the loading apparatus and of a feed belt conveyor of a horizontally movable loading plant for loading the loading platform of motor vehicles.
Figure 15:
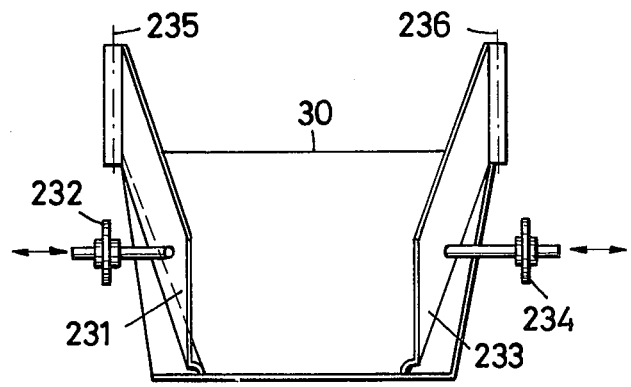
FIG. 15 is a front elevational view of the chute of FIG. 14.

The loading head 10 is connected to an inclined carrier conveyor 216 of a feed belt conveyor 200. The feed belt conveyor 200 includes a roller track 215 and a feed track 214 that are mounted at the ceiling D of a warehouse or the like (FIG. 14). Above the carrier conveyor 216 and parallel thereto is arranged a flattening belt 218. The flattening belt 218 may be spaced from the carrier conveyor 216 by means of springs 217. The overall arrangement is such that the carrier conveyor 216 and the flattening conveyor 218 may follow any height adjustment of the loading head 10 in the direction $x_4$, and the loading head is movable jointly with the feed belt conveyor 200 in the horizontal direction y, in thus allowing to readily load the unobstructedly accessible loading platform of trucks.

Figure 16:
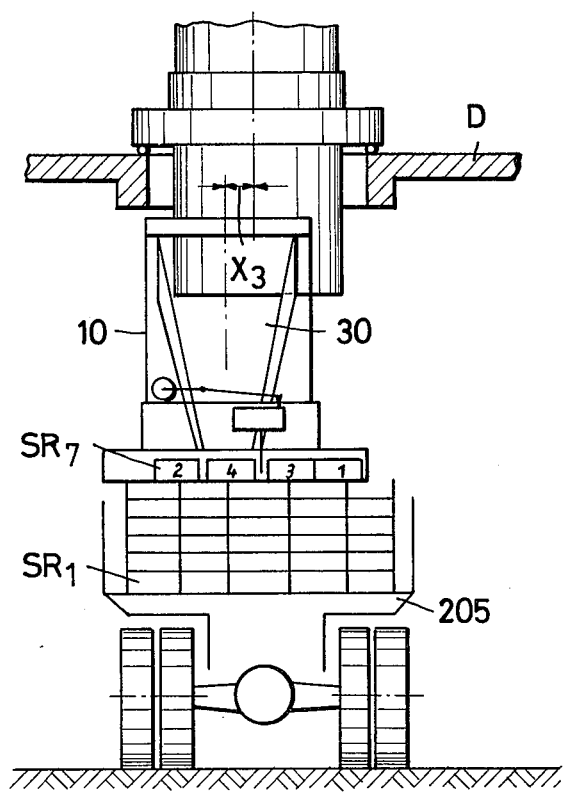
FIG. 16 is a front elevational view of the loading head of the loading apparatus after the loading head has been shifted by a distance corresponding to half a sack width, and further illustrating schematically a truck with sacks stacked thereon whereby the uppermost sack layer is laterally displaced.

The side walls 231, 233 of the chute 30 may be pivoted about axes 235, 236 by associated actuators 232, 234 (FIG. 15), in thus allowing to vary the velocity of the sacks S before the latter engage the packing plate 25. By moving the loading head 10 through a distance of half a sack width in the direction $x_3$, the sack row SR will be offset with respect to the sack row SR that is stacked underneath (FIG. 16).

Figure 17:
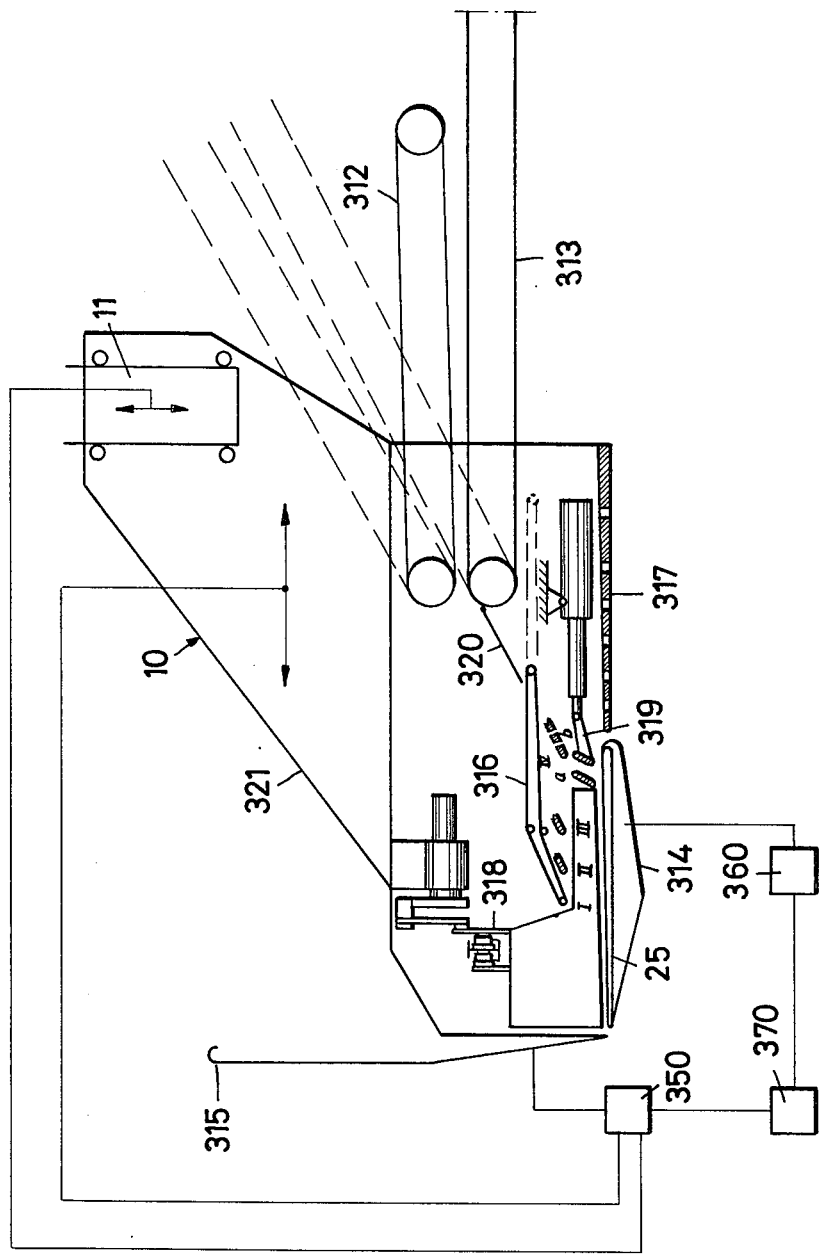
FIG. 17 is a schematical lateral elevational view of still another embodiment of the inventive loading apparatus.
Figure 18:
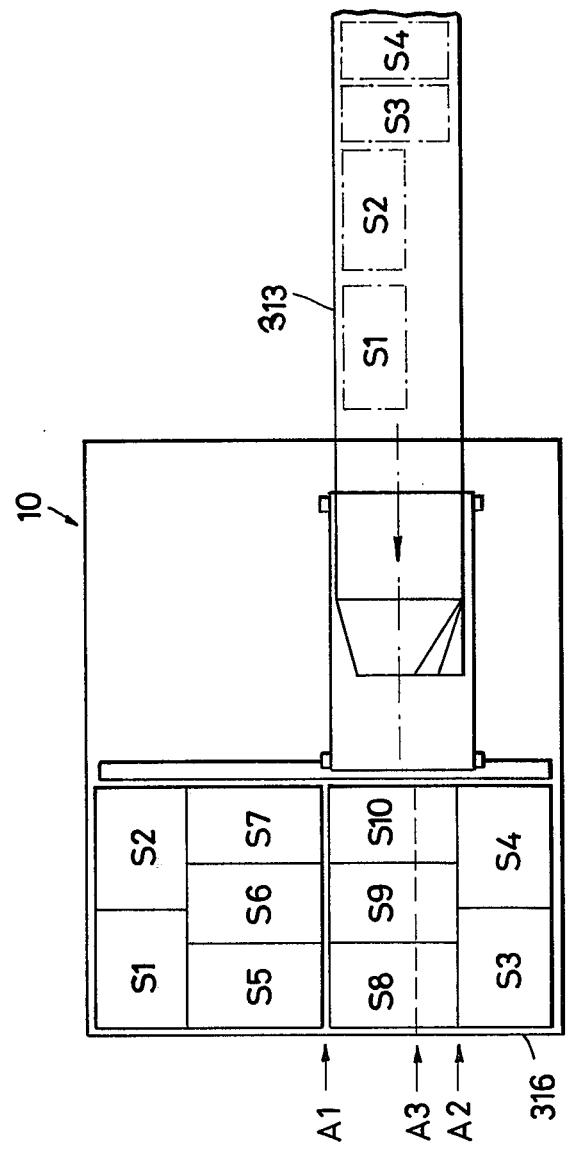
FIG. 18 is a top view of the loading apparatus of FIG. 17.

In the embodiment shown in FIGS. 17 and 18, the chute 320 is arranged immediately adjacent the discharge portion of a flattening belt 312 and a feed conveyor 313 and is inclined toward a timing conveyor 316. The timing conveyor 316 may be adjusted into various positions I, II, III and IV. A packing plate 25 that may selectively be adjusted to open and closed positions is arranged below the timing conveyor 316.

When carrying out a loading operation, the loading head 10 is put down on e.g. pallets by means of the elevating mechanism mounted on the mounting frame 11. By means of the lower sensing plate 314 the loading head 10 is deenergized. Then the loading head 10 is moved against a ramp or another object whereby this movement may be controlled by a front sensing plate 315.

The sacks being supplied via the feed conveyor 313 and the flattening conveyor 312, along the chute 320 and the timing conveyor 316, arrive at the packing plate 25. The pusher member will then be in its initial position A2 (FIG. 18). Two sacks lined up side-by-side are transferred in the feed direction toward the right. The following sacks S3 and S4 are likewise lined up side by side and are subsequently moved from the pusher position A1 into the pusher position A2.

The timing conveyor 316 is moved into the positions II or IV respectively for the sacks S1, S2 and S3, S4 respectively. The next three sacks S5 to S7 extend crosswise whereby the pusher 318 is in the position A2 and the timing conveyor 316 is moved from position I through position III into position IV. These sacks are moved into position A1 by means of the pusher 318. In the same manner, there will follow three sacks S8 to S10, these sacks likewise extending crosswise. Finally the pusher 318 moves into the position a, the packing plate 25 opens and the sacks are being transferred (FIGS. 17 and 18).

As shown in FIG. 17, the loading head 10 includes a sensing plate 314 connected to control members 350 that together with control members 360 of the sensing plate 314 are coupled to a controller 370 for controlling feed and height adjustment of the elevating frame 321.

Figure 19:
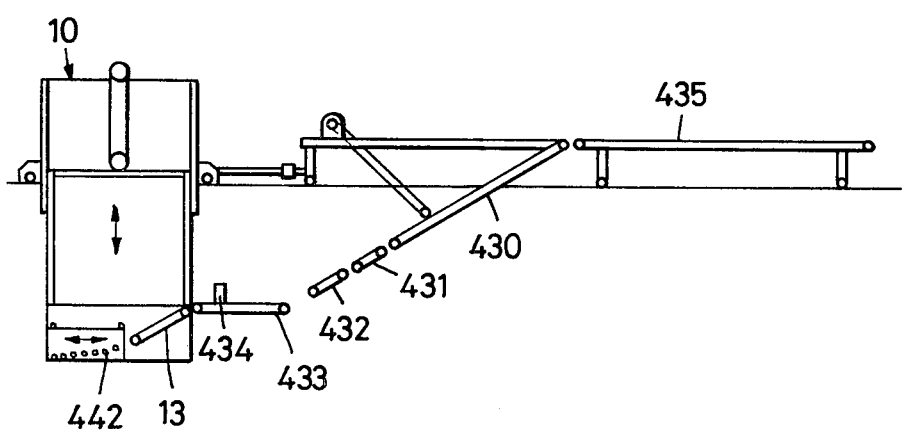
FIG. 19 is a schematical illustration in a lateral elevation of the loading apparatus with sack feed track.

The embodiment of the loading apparatus shown in FIG. 19 includes the loading head 10, and discrete goods such as sacks are fed to this loading head via a feed track. This feed track is formed by a feed conveyor 435, an upwardly and downwardly adjustable storage track 430, a supply conveyor 431 and a pull-off conveyor 432. The loading head 10 includes an alignment conveyor 433 with a sack pivoting assembly 434 by means of which sacks or discrete goods of other types may be adjusted into a longitudinal or transverse position before being transferred onto the feed conveyor 313 of the loading head 10, in accordance with a predetermined stacking pattern.

In performing the loading operation, the loading head 10 is lowered onto e.g. pallets by means of an elevating mechanism, and then deenergized by means of the lower sensing plate 453. Subsequently, the loading head 10 is moved towards a ramp or another object until the forward sensing plate 454 comes into engagement with the ramp or other object.

Figure 20:
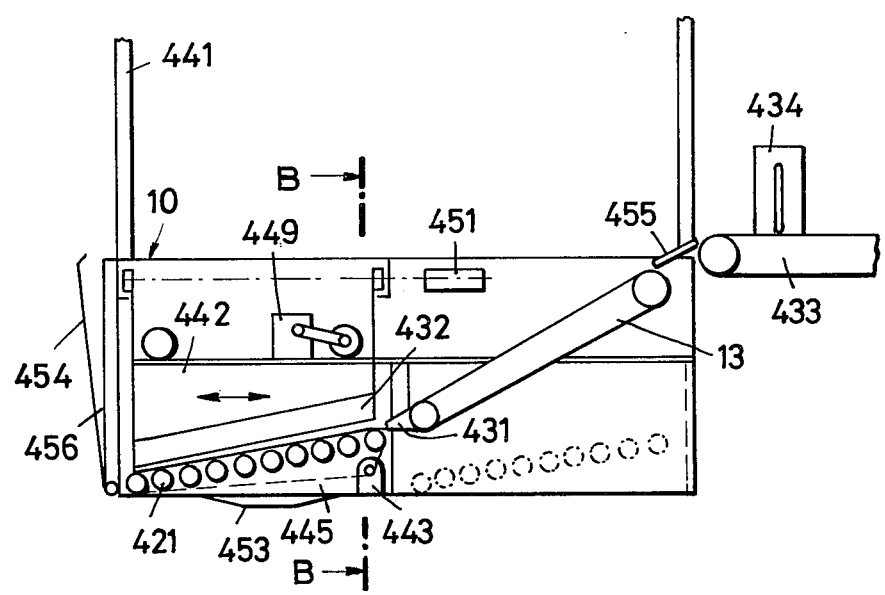
FIG. 20 is a lateral cross-sectional view of the loading apparatus having a packing table surface in the form of a roller track.

The sacks being discharged from the alignment conveyor 433 pass along a bar chute 455 to the feed conveyor 313 of the loading apparatus 440, and the latter may be vertically adjusted by cross beams 441 actuated by an elevating mechanism (FIG. 20). The bar chute 455 comprises bars extending in the feed direction whereby rotational movements of the sacks are prevented so that the sacks are being transferred onto the metering conveyor 413 in the same spatial alignment as has been established on the alignment conveyor 433.

Figure 21:
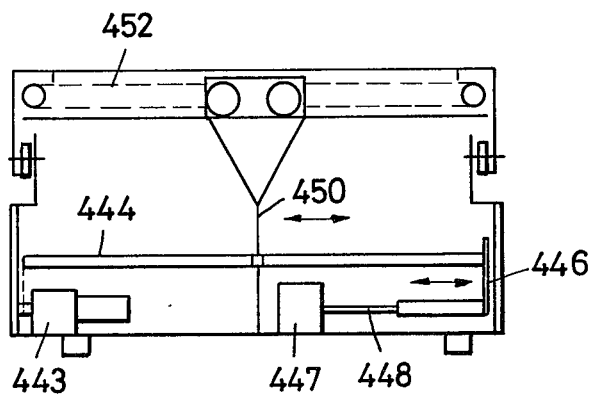
FIG. 21 is a cross-sectional view of the loading apparatus wherein the packing table surface consists of a roller track.

The feed conveyor 313 is followed by a packing table 442 the upper surface of which is formed by a roller track 421 (FIGS. 20 and 21). The rollers 444 may be driven by a drive unit 443 via a chain drive 445 or the like, and serve to move the sacks against a stop wall 456 arranged at the rear of the packing table 442 when looking in the feed direction. When sacks engage the stop wall 456, the rollers 444 can rotate freely underneath the sacks. The rollers 444 may also consist of centrally divided or split roller halves.

A transfer member 450 may be moved parallel to the longitudinal axis of the rollers 444 via a chain drive 452 and driven by a drive unit 451. The transfer member 450 serves to move a sack row toward one side of the packing table 442. When the last sacks have reached the packing table 442, the transfer member 450 remains in its position. For avoiding gaps being formed between an already aligned sack layer and sacks that have subsequently been supplied, there is provided another transfer member 446. This transfer member 446 is driven by a drive unit 447, via a chain drive 448 or the like and may be moved parallel to the longitudinal axis of the rollers 444. When removing the packing table 442 whilst the rollers 444 rotate, the stacked sack layer may be transferred. The drive units 447, 451 for the transfer members 446, 450 respectively may be arranged above as well as below the packing table 442.

Figure 22:
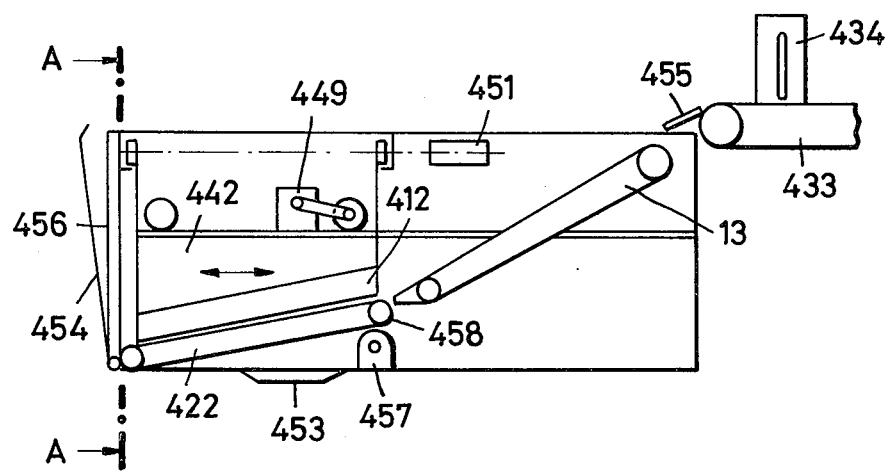
FIG. 22 is a vertical sectional view of the loading track wherein the packing table surface consists of a belt conveyor.
Figure 23:
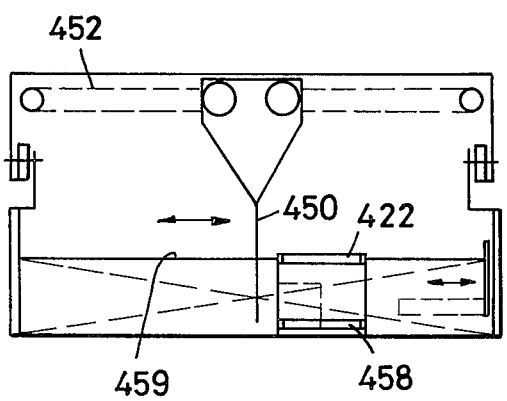
FIG. 23 is a vertical sectional view of the loading apparatus wherein the packing table surface consists of a belt conveyor.

The packing table surface 452 of the packing table 442 may also consist of a belt conveyor 422 driven by a drive unit 457 and including a smooth low-friction belt 458 (FIGS. 22 and 23). The conveyor 422 may be dimensioned so as to extend across part or all of the width of the packing table 442.

Figure 24:
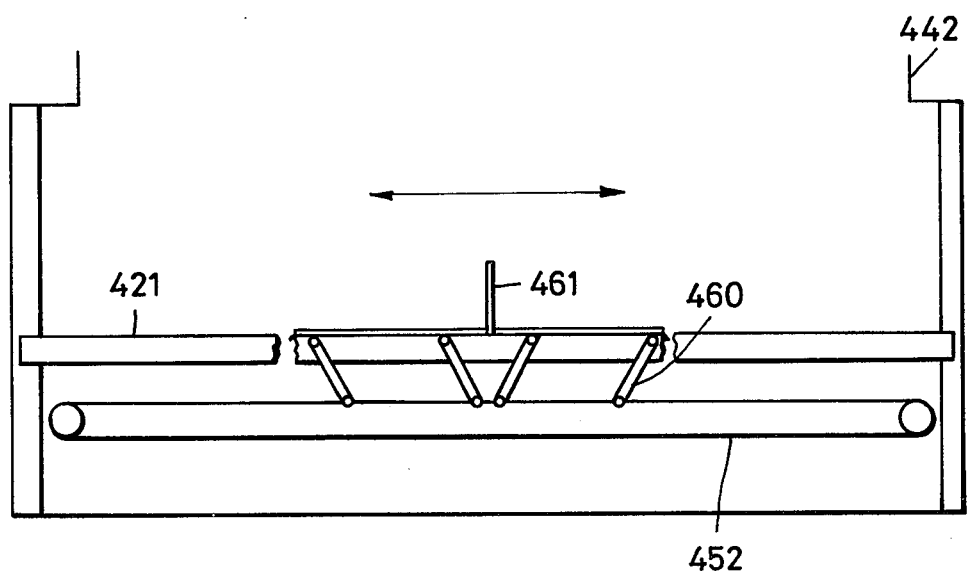
FIG. 24 is a vertical sectional view of a packing table wherein the packing table surface consists of a roller track and further illustrating a pusher fork adapted to be moved by control levers.

If the packing table surface 459 includes a roller track 421, the transfer member movable in the longitudinal direction of the rollers may also be formed as a pusher fork 461 (FIG. 24). This pusher fork may be moved by means of a control lever 460 that is arranged below the roller track 421 and driven by a chain drive 452 or the like. When withdrawing the pusher fork 461, the control levers 460 are automatically disengaged in thus allowing a simple and uncomplicated distribution of sacks along the roller track 421.

Apart from an elevating structure, the loading apparatus furthermore includes control devices for controlling the loading head 10, in order to ensure that the sacks are arranged perfectly intermediate the ramps and are perfectly stacked. Various sack stacking patterns such as may be required for achieving a perfect stability of sack stacks may readily be achieved. The loading head may comprise tolerance compensation devices for adapting the height of the loading head to various elevational levels or level differences of loading platforms.

For increasing the capacity of the loading apparatus, it may be possible, whilst transferring an already assembled layer of sacks onto a loading platform and withdrawing the packing table 442 into a position below the feed conveyor 413 to assembled on the feed conveyor 413, by means of the sack pivoting assembly 434, another layer of sacks consisting of sacks extending longitudinally and transversely of the feed direction, and to transfer the sacks, after advancing the packing table 442 into its operation position, onto the packing table. As a particularly advantageous characteristic, a vertically tiltable chute 431 may be provided at the discharge end portion of the feed conveyor 313. The chute 431 would include support members 432 in sliding or rolling contact with the packing table 442 (FIG. 20).

Since the discharge end portion of the chute 431 will be adapted to the height of the packing table 442, a sack layer pre-assembled on the feed conveyor 413 may already be transferred onto the packing table 442 when advancing the packing table 442 from its position below the feed conveyor 413. This further reduces the idle time of the loading apparatus.

The automatic loading apparatus of the present invention allows to load the loading platform of trucks or generally loading platforms of any type or pallets, independently of the feeding means, and the latter may consist of a conveyor, a chute or a roller track. The loading apparatus represents a truly multi-purpose equipment that may be employed as a sub-assembly. The loading apparatus may be coupled to the quayside or ship's hold side of ship loading and unloading apparatus, including for example spiral chutes, or may be used in combination with fork lifts and the like. The number of stacked sack layers may vary within very wide limits; as a rule between 5 to 7 sack layers will be stacked. When employing the automatic loading apparatus, no operators are required on the loading platform. The fully automatic operation allows high outputs.

The sack pivoting assembly consists of a rotatably mounted carrier conveyor adapted to be rotated by a drive unit, or a rotary table including devices for transferring the discrete goods onto the feed conveyor.

The embodiments of the invention in which an exclusive property or privilege is claimed are defined as follows:

1. An automatic loading apparatus for loading discrete cargo, particularly sacks, onto a stacking plane on stationary or mobile loading platforms, comprising a machine frame, a feed track for feeding discrete goods mounted in the machine frame, a packing plate and pusher means movable in opposite directions within a plane above the packing plate, the packing plate and the pusher means being movable upwardly and downwardly in a substantially vertical direction through a distance corresponding substantially to the height of a layer of sacks, said apparatus being characterized by the combination of the following characteristics:

a. a loading head consisting of a mounting frame including a vertical support rod and a horizontally cantilevered substantially rectangular frame secured to the support rod, a vertical stop plate extending across the whole width of the packing plate mounted at one face of the rectangular frame and having a pair of longitudinal frame members defining guide rails for guiding a pair of slides movable respectively along either side of the rectangular frame, the slides being driven in a substantially horizontal direction by an associated drive unit, and mounting at their free lower ends the packing plate, the latter being spaced from the frame by a distance corresponding at least to the height of a sack layer, the packing plate being movable in a horizontal direction and transversely of sack rows being assembled and adapted to cooperate with a stationary stop bar extending transversely of the pull-off direction of the packing plate in a position opposite the vertical stop plate;

b. means for slidably displacing the loading head in a plane parallel to the stacking plane;

c. sack feed means on the upstream side of the loading head, the sack feed means being disposed at an elevating frame in the machine frame in the vicinity of the discharge end of feed conveyor means, and cyclically operated timing feed conveyor means extending parallel to the feed direction of discrete goods and adapted to be moved in increments corresponding substantially to the length or width dimension of the discrete goods;
d. means for moving the packing plate in the sack feeding direction, a first sensing plate mounted on the bottom of the packing plate, and spring plates each mounted on an opposite end of said packing plate and serving as actuating means for associated electrical switches;
e. transfer means provided above the packing plate adjacent an end of transverse pusher means that faces the sack feeding means;
f. sack pivoting means operatively associated with the sack feeding means;
g. the loading head including a second sensing plate located adjacent one side of said packing plate and connected to control members, and these control members being coupled, together with respective control members associated with the first sensing plate, to controller means for controlling feed and elevational movements of the elevating frame.

2. An automatic loading apparatus as in claim 1 wherein said sack pivoting means is arranged adjacent the downstream end of said sack feeding means and wherein said sack feeding means comprises a chute.

3. An automatic loading apparatus as in claim 1 wherein said sack pivoting means is arranged adjacent the upstream end of said sack feeding means and wherein said sack feeding means comprises metering feed conveyor means.

4. An automatic loading apparatus as in claim 1 wherein an additional conveyor means is coupled, at its discharge end, to a sack pivoting assembly via an upwardly and downwardly movable storage track, a supply conveyor, a pull-off conveyor and an alignment conveyor, a bar chute disposed at the upstream end of the alignment conveyor and intermediate alignment conveyor and metering conveyor, the bars of the bar chute extending in the transfer direction, a packing table arranged at the end of the metering conveyor remote from the bar chute, the packing table having as the packing table surface a roller track including a plurality of rollers adapted to be driven by a drive unit, a stop wall at the downstream end of the packing table, motor driven transfer members being mounted above the packing table and adapted to be moved in a direction parallel to the longitudinal axes of the rollers.

5. An automatic loading apparatus as in claim 4 wherein the rollers of the roller track consist of centrally divided roller members.

6. An automatic loading apparatus as in claim 4 wherein the packing table surface comprises a motor-driven conveyor including a smooth low-friction belt.

7. An automatic loading apparatus as in claim 4 wherein the transfer members movable in a direction parallel to the longitudinal axes of the packing table rollers are in the form of pusher forks adapted to be actuated by control levers arranged below the roller track and driven by a chain drive or the like.

8. An automatic loading apparatus as in claim 4 wherein a vertically tiltable chute is arranged at the downstream end of the feed conveyor means and adapted to be supported on the packing table by means of lateral support members in sliding or rolling contact with the packing table.

* * * * *